United States Patent [19]

Yuasa et al.

[11] Patent Number: 5,051,131
[45] Date of Patent: Sep. 24, 1991

[54] AZO DISPERSING AGENTS AND AZO PIGMENT COMPOSITIONS

[75] Inventors: Takahiro Yuasa; Kenzi Kitamura, both of Tokyo, Japan

[73] Assignee: Toyo Ink Manufacturing Co., Ltd., Tokyo, Japan

[21] Appl. No.: 448,866

[22] Filed: Dec. 12, 1989

[51] Int. Cl.$^5$ ............... C09B 29/15; C09B 29/33; C09B 67/20; C09D 11/02
[52] U.S. Cl. ........................ 106/494; 106/23; 106/402; 106/496; 534/573; 534/739; 534/749; 534/743; 534/747; 534/750; 534/841; 534/842; 534/868; 534/874; 534/875
[58] Field of Search .............. 534/739, 740, 741, 742, 534/743–748, 573 M, 749, 750, 841, 842, 868, 874, 875; 106/494, 493

[56] References Cited

U.S. PATENT DOCUMENTS 4,664,709  5/1987  Castenson .................... 534/573 M

FOREIGN PATENT DOCUMENTS 3329846  2/1985  Fed. Rep. of Germany ... 534/573 M

Primary Examiner—Mary C. Lee
Assistant Examiner—Fiona T. Powers
Attorney, Agent, or Firm—Wenderoth, Lind & Ponack

[57] ABSTRACT

An azo pigment composition which forms a dispersion having high tinting strength and excellent clearness, transparency, fluidity and storage stability, and which is formed from a coupling reaction between a diazo component and a coupler component, and contains a compound represented by formula (I)

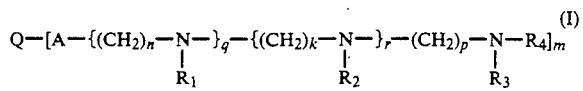

wherein Q represents a diazo or coupler component moiety,

A represents a divalent bonding group selected from a class consisting of $-CONR'-$, $SO_2NR'-$, $-CH_2NH-$ and $-CH_2NHCOCH_2NH-$ in which R' represents a hydrogen atom, alkyl group having 1 to 20 carbon atoms or aryl group, each of $R_1$, $R_2$, $R_3$ and $R_4$ represents a hydrogen atom, alkyl group having 1 to 20 carbon atoms or alkenyl group having 2 to 20 carbon atoms, and $R_3$ and $R_4$ together may form a hetero ring, each of n, k and p independently represents an integer of 2 or 3, m represents an integer of 1 or 2, and each of q and r represents an integer of 0 to 7 provided that q+r represents an integer of 0 to 7 provided that when Q represents the diazo component moiety, the amount of the compound of formula (1) is 0.1 to 30% by weight based on the diazo component, and when Q represents the coupler component, the amount of the compound of formula (I) is 0.1 to 30% by weight based on the coupler component.

4 Claims, No Drawings

AZO DISPERSING AGENTS AND AZO PIGMENT COMPOSITIONS

FIELD OF THE INVENTION

The present invention relates to an azo pigment composition which exhibits excellent tinting strength, clearness, transparency, fluidity and storage stability when dispersed in a vehicle.

BACKGROUND OF THE INVENTION

Conventionally, azo pigments, pigments of C. I. No. 11710, 21090, 21100, 21095, 15630:1, 15585:1, 158501:1, etc., in particular, are widely used to color printing inks, coating compositions and plastics. However, the tinting strength, clearness and transparency of these pigments are inferior, and their fluidity in a vehicle is also poor. In order to improve the dispersibility of a pigment in a vehicle, a method is known which comprises treating the pigment with a rosin. However, this method involves a problem that the tinting strength is degraded. Further, another technique is known which comprises adding 0.1 to 50% by weight of a methyl-, carboxyl-, halogen atom- and/or nitro group-substituted diazo or coupler component into a diazo or coupler component. However, the resultant pigment has great drying and aggregation force and requires a considerably longer period of time to be dispersed in a vehicle, and a dispersion prepared therefrom also has a high viscosity.

Japanese Patent Laid-Open Publication No. 166266/1981 discloses a dispersant of an amine-based pigment derivative. This dispersant has a great effect on making a pigment fine and stabilizing it, and a dispersion prepared by dispersing a pigment in a vehicle by using this dispersant has a low viscosity and good storage stability. However, this dispersant can give no satisfactory quality of clearness and transparency.

U.S. Pat. No. 4,664,709, corresponding to Japanese Patent Laid-Open Publication No. 246260/1986, discloses a dispersant in which alkyl amine(s) such as tetramine, triamine, etc., is directly connected to a coloring matter. However, a dispersion formed by dispersing a pigment in a vehicle by using this dispersant causes a stain on hue, and fails to give satisfaction concerning dispersibility, gloss, concentration, viscosity, stability with time, etc.

SUMMARY OF THE INVENTION

It is an object of the present invention to provide an azo pigment which forms a dispersion having high tinting strength and excellent clearness, transparency, fluidity and storage stability when dispersed in a vehicle, and process for producing said azo pigment composition.

According to the present invention, there is provided an azo pigment composition formed from a coupling reaction between a diazo component and a coupler component, which contains a compound represented by formula (I)

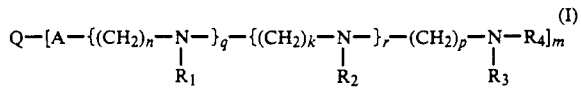

wherein Q represents a diazo or coupler component moiety,

A represents a divalent bonding group selected from a class consisting of —CONR'—, SO$_2$NR'—, —CH$_2$NH— and —CH$_2$NHCOCH$_2$NH— in which R' represents a hydrogen atom, alkyl group having 1 to 20 carbon atoms or aryl group, each of R$_1$, R$_2$, R$_3$ and R$_4$ represents a hydrogen atom, alkyl group having 1 to 20 carbon atoms or alkenyl group having 2 to 20 carbon atoms, and R$_3$ and R$_4$ together may form a hetero ring, each of n, k and p independently represents an integer of 2 or 3, m represents an integer of 1 or 2, and each of q and r represents an integer of 0 to 7 provided that q+r represents an integer of 0 to 7, preferably 1 to 7.

provided that when Q represents the diazo component moiety, the amount of the compound of formula (1) is 0.1 to 30% by weight based on the diazo component, and when Q represents the coupler component, the amount of the compound of formula (I) is 0.1 to 30% by weight based on the coupler component.

Further, according to the present invention, there is also provided a process for producing an azo pigment composition by a coupling reaction between a diazo component and a coupler component, which comprises adding to the diazo or coupler component 0.1 to 30% by weight, based on the diazo or coupler component, of the compound of formula (I) in a powder state or a solution thereof in an organic acid or mineral acid, and subjecting the diazo or coupler component containing said compound to a coupling reaction with the coupler or diazo component.

DETAILED DESCRIPTION OF THE INVENTION

Examples of primary amines for the diazo component are aromatic amines such as 1-amino-4-methylbenzene-2-sulfonic acid, 1-aminoaphthalene-2-sulfonic acid, 1-amino-4-methyl-5-chlorobenzene-2-sulfonic acid, 1-amino-4-chloro-5-methylbenzene-2-sulfonic acid, 4-chloro-2-nitroaniline, 3,3-dichlorobenzidine, etc.

Examples of the coupler component are β-naphthol, β-oxynaphthoic acid, naphthol AS type components, and acetoacetanilide type components such as acetoaceto-2,4-xylide, acetoaceto-o-toluidide, o-chloroacetoacetanilide, acetoaceto-2,5-dimethoxy-4-chloroanilide, etc.

The present invention uses the compound of the following general formula (I) as part of the diazo component or coupler component,

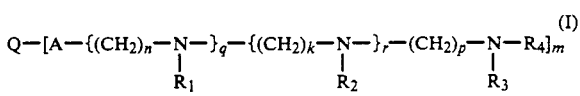

In the above general formula, Q represents a diazo component moiety or a coupler component moiety. As a diazo component moiety, there may be used all of the aforementioned aminobenzene-based and aminonaphthalene-based diazo components, and preferably usable is non-substituted aminobenzene, i.e. aniline moieties. The aforementioned examples of the coupler component is usable as the coupler component moiety, and preferably usable is an acetoacetanilide moiety. Each of the above R$_1$ to R$_4$ is a hydrogen atom, an alkyl group having 1 to 20 carbon atoms or an alkenyl group having 2 to 20 carbon atoms. In view of production and effect, preferably usable are compounds in which R$_1$ and R$_2$ are hydrogen atoms and $R_3$ and $R_4$ are both lower alkyl groups such as methyl, ethyl, propyl, butyl, etc. $R_3$ and $R_4$ may be a hetero ring containing a nitrogen atom, oxygen atom or sulfur atom.

Each of n, k and p is an integer of 2 or 3. Each of q and r can be an integer of from 0 to 7 under the condition that q+r is 0 to 7, and m is an integer of 1 to 2.

The compound of formula (I) can be produced by a variety of processes, and some of the processes are as follows.

When Q in the formula is a diazo component, advantageous is a process using, as a starting material, a compound having substituents which can react with an amino compound such as nitrobenzoyl chloride, acetoacetylaminobenzenesulfonyl chloride, or the like and easily changes an aromatic amine by reduction or hydrolysis. That is, the compound of formula (I) can be easily produced by a process which comprises reacting the above starting material with an amino compound having at least two amino groups in water or an organic solvent, optionally together with an alkaline compound such as potassium carbonate, sodium carbonate, or the like, and changing the nitro groups into amino groups by catalytic reduction using a palladium-carbon catalyst, etc., or reduction using iron-acetic acid, or changing acetylamino groups into amino groups by using diluted hydrochloric acid.

When Q in the formula is a coupler component moiety, the compound of formula (I) can also be easily obtained by reacting the above-mentioned compound with diketene in water or an organic solvent.

The azo pigment composition of the present invention can be produced by adding the compound of general formula (I), which is in a powder state or in a solution state prepared by dissolving it in an acetic acid or mineral acid, to the diazo or coupler component, and carrying out a coupling reaction between the diazo component and the coupler component according to a customary method. The above coupling reaction may be carried out in the co-presence of a compound of formula (I) in which Q is a diazo component moiety and a compound of formula (I) in which Q is a coupler component moiety. Thereafter, a lake pigment thereof may be formed by adding a lake-forming agent. Alternatively, the lake-forming agent is added to the diazo component and/or coupler component in advance, and formation of a lake pigment is carried out simultaneously with the coupling reaction. Examples of the lake-forming agent are calcium chloride, barium chloride, strontium chloride, etc.

Further, the pigment may be naturally surface-treated by adding a water-soluble resin, surface active agent or other additives to the diazo component, the coupler component, die or a pigment slurry.

The amount of the compound of formula (I) is 0.1 to 30% by weight, preferably 1 to 10% by weight, based on the diazo or coupler component. When the amount is less than 0.1% by weight, it is impossible to obtain any effect of the compound of formula (I). Even when the amount is more than 30% by weight, the effect cannot be increased any further.

According to the present invention, there is provided an azo pigment composition having high tinting strength and excellent clearness, transparency, fluidity and storage stability, and a process for producing said pigment composition.

The present invention will be illustrated hereinbelow by reference to Examples, in which "part" and "%" stand for "part by weight" and "% by weight" respectively. The following are Synthesis Examples of typical compounds of general formula (I).

SYNTHESIS EXAMPLE 1

Benzoyl p-nitrochloride (19 parts) and 12 parts of dimethylaminopropylamine were stirred under reflux in acetone for 2 hours to synthesize a carboxylic acid amide. Then, the carboxylic acid amide was catalytically reduced in ethanol by adding 0.1 part of a 5% palladium-carbon catalyst to give 20 parts of the following diazo component.

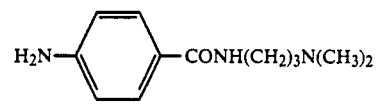

SYNTHESIS EXAMPLE 2

Eleven parts of the diazo component obtained in Synthesis Example 1 and 5 parts of diketene were stirred under reflux in xylene for 2 hours to give 14 parts of the following coupler component.

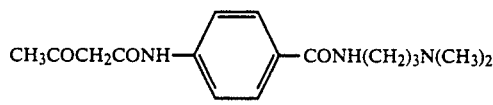

SYNTHESIS EXAMPLE 3

Twenty-one parts of 5-nitroisophthalic acid and 26 parts of thionyl chloride were stirred under reflux in xylene for 1 hour to synthesize an acid chloride. Then, the acid chloride was reacted with 28 parts of diethylaminoethylamine to synthesize a carboxylic acid amide, and the carboxylic acid amide was reduced and acetoacetylated in the same way as in Synthesis Examples 1 and 2 to give 37 parts of the following coupler component.

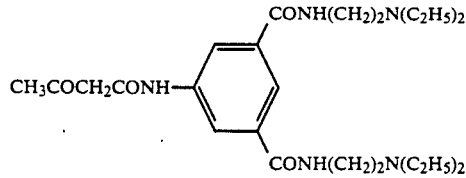

SYNTHESIS EXAMPLE 4 p-Acetoaminobenzenesulfonylchloride (23 parts), 36 parts of oleylaminopropylamine and 7 parts of potassium carbonate were stirred in an acetone/water (1:1) mixed solvent at 40° C. for 3 hours to synthesize a sulfonic acid amide. Then, the sulfonic acid amide was hydrolyzed by stirring it in 5N hydrochloric acid under reflux for 3 hours, and then acetoacetylated in the same way as in Synthesis Example 2 to give 45 parts of the following coupler component.

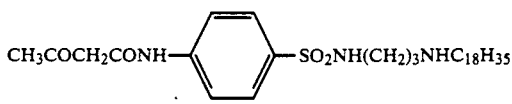

SYNTHESIS EXAMPLE 5 m-Nitrobenzylchloride (17 parts) and 35 parts of pentaethylenehexamine were stirred in dioxane under reflux for 2 hours, and then reduction and acetoacetylation were carried out in the same way as in Synthesis Examples 1 and 2 to give 32 parts of the following coupler component.

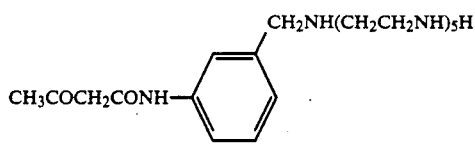

SYNTHESIS EXAMPLE 6

Nitrobenzene (12 parts), 14 parts of chloroacetamide and 5 parts of p-formaldehyde were stirred in sulfuric acid at 80° C. for 3 hours to synthesize a m-nitrochloroacetoaminomethylbenzene. Then, the m-nitrochloroacetoaminomethylbenzene and 22 parts of dibutylaminopropylamine were stirred in ethanol under reflux for 5 hours, and reduced in the same way as in Synthesize Example 1 to give 28 parts of the following diazo component.

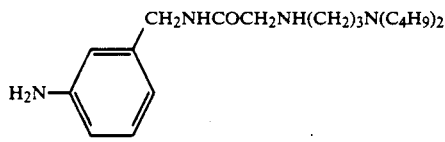

EXAMPLE 1

1-Amino-4-methylbenzene-2-sulfonic acid (17.7 parts), 300 parts of water and 4 parts of sodium hydroxide were mutually dissolved at room temperature to form a solution. 25 parts of 35% hydrochloric acid was added to acidify the solution, then 200 parts of ice was added and the solution was cooled to 0° C.

Separately, 1 part of the compound obtained in Synthesis Example 1 was dissolved in 50 parts of 10% acetic acid in advance, and this mixture was added to the solution. A solution of 7 parts of sodium nitrite in 25 parts of water was added to the solution, which was stirred at a temperature of not more than 5° C. for 30 minutes to form a diazo component.

On the other hand, 19 parts of β-oxynaphthoic acid, 1 part of natural rosin, 1,000 parts of water and 10 parts of sodium hydroxide were mutually dissolved at 15° C. to form a coupler component.

The above diazo component was added to this coupler component dropwise over 30 minutes, and then the mixture was further stirred continuously for 1 hour to complete a coupling reaction. The coupling reaction product had a pH of 9.0.

Thereafter, 60 parts of a 35% calcium chloride aqueous solution was added, and the mixture was stirred for 2 hours to complete a lake-formation reaction. The resultant reaction product was heated to 70° C., filtered, washed with water, dried, and pulverized to give 40 parts of a red pigment.

COMPARATIVE EXAMPLE 1—1

The procedure of Example 1 for a coupling reaction was repeated except that the acetic acid solution of the compound obtained in Synthesis Example 1 was not added, and the other procedure of Example 1 for synthesis was also repeated to give 39 parts of a red pigment.

COMPARATIVE EXAMPLE 1—2

Water (300 parts) and 14.6 parts of 35% hydrochloric acid were added to 23 parts of the compound obtained in Synthesis Example 1, and the mixture were mutually dissolved. Then, 300 parts of ice was added to the resultant solution, and the solution was cooled to 0° C. A solution of 7 parts of sodium nitrite in 25 parts of water was added to the cooled solution, and the mixture was stirred at a temperature of not more than 5° C. for 30 minutes to form a diazo component.

Separately, 19 parts of β-oxynaphtoic acid, 1,000 parts of water and 10 parts of sodium hydroxide were mutually dissolved at room temperature to form a coupler component. Thereafter, the procedure of Example 1 was repeated to give 40 parts of a red pigment derivative. And the pigment obtained in Comparative Example 1—1 and this red pigment derivative were mixed in a ratio of 95 part to 5 part.

An offset ink prepared from the pigment of Example 1 and a rosin-modified phenolic resin varnish had better transparency, clearness and fluidity and higher tinting strength than inks prepared from the pigments obtained in Comparative Examples 1—1 and 1—2. Test methods for transparency, clearness, fluidity and tinting strength and the test results are as follows.

TEST METHODS AND TEST RESULTS

A pigment and a varnish for offset ink were mixed in the following amounts to prepare an ink, and inks prepared by Hoover muller milling 100×4 were referred to as a deep color ink.

| | |
|---|---|
| Pigment | 0.5 part |
| Varnish for offset ink | 2.0 parts |
| Total | 2.5 parts |

The transparency and clearness was evaluated by examining the deep-color inks by the eyes.

The fluidity was evaluated based on values for a radius of spreading of an ink in a spread o meter at 25° C. The tinting strength was evaluated by using a light-color ink prepared by fully mixing 0.5 part of a deep-color ink with 5 parts of a white ink. It was possible to further add a white ink to the light-color ink from Example 1 by about 10% more until the density of this light-color ink become identical with that of the ink from Comparative Example 1—1. As to an ink from Comparative Example 1—2, it was possible to further add a white ink by about 2% more.

TABLE 1

| | Fluidity | Transparency · clearness | Tinting strength |
|---|---|---|---|
| Example 1 | 17.9 | high | +10% |
| C-Example 1-1 | 17.6 | low | standard |

TABLE 1-continued

| | Fluidity | Transparency · clearness | Tinting strength |
|---|---|---|---|
| C-Example 1-2 | 17.9 | low | +2% |

EXAMPLE 2, COMPARATIVE EXAMPLE 2

Hydrochloride of 3,3'-dichlorobenzidine (20.5 parts), 250 parts of water and 19.1 parts of 35% hydrochloric acid were mutually dissolved at room temperature. 230 parts of ice was added to the solution, and the solution was cooled to 0° C. A solution of 9.7 parts of sodium nitrite in 35 parts of water was added to the solution to form a diazo component.

On the other hand, 13 parts of sodium hydroxide and 24.1 parts of acetoaceto-o-toluidide were dissolved in 250 parts of water at room temperature, and 205 parts of a 10% acetic acid solution was added thereto dropwise to obtain a precipitate by acid precipitation. Separately, 3.8 parts of the compound obtained in Synthesis Example 2 was dissolved in 64 parts of 10% acetic acid solution in advance, and the resultant solution was added to the precipitate to form a coupler component.

The above diazo component was added to the coupler component over about 2 hours, and the mixture was further stirred for 10 minutes to complete a coupling reaction. Then, the reaction product was filtered, washed with water, dried, and pulverized to give 40 parts of a yellow pigment.

A gravure ink prepared from this pigment had high gloss and tinting strength and better fluidity than an ink prepared from a pigment to which the compound of Synthesis Example 2 was not incorporated (Comparative Example 2).

TEST METHODS AND TEST RESULTS

The following components in the following amounts were charged into a 200 cc glass bottle.

| | |
|---|---|
| Nitrocellulose-based resin | 60 parts |
| Acetic acid ethyl ester | 30 parts |
| Pigment | 10 parts |
| Glass beads having a diameter of 3 mm | 100 parts |
| Total | 200 parts |

The charged plastic bottle was shaken in a paint conditioner for 2 hours to form a deep-color ink. Further, 1 part of the deep-color ink and 10 parts of a white ink were kneaded to form a light-color ink, and the tinting strength was evaluated. The viscosity was measured at 25° C. by using a BM viscometer. And an ink was applied with a bar coater (film thickness 20 μm) and gloss was measured by using a gloss meter (manufactured by Suga Shikenki K.K., incident angle: 60°).

Table 2 shows the results.

TABLE 2

| | Tinting strength | Gloss | Initial viscosity (unit: cps) | | | |
|---|---|---|---|---|---|---|
| | | | 6 rpm | 12 | 30 | 60 |
| Example 2 | +26% | 53% | 385 | 360 | 360 | 350 |
| C-Example 2 | standard | 24% | 6,000 | 4,500 | 4,300 | 4,010 |

EXAMPLE 3, COMPARATIVE EXAMPLE 3

The procedure of Example 2 for a coupling reaction was repeated except that 20.8 parts of 4-chloro-2-nitroaniline was used in place of hydrochloride of dichlorobenzidine, that 27.6 parts of o-chloroaoetoacetanilide in place of acetoaceto-o-toluidide and that 3 parts of the compound obtained in Synthesis Example 3 in place of the compound obtained in Synthesis Example 2. Then, the resultant slurry was heated up to 90° C., filtered, washed with water, dried and pulverized to give 46 parts of a yellow pigment.

A coating composition prepared from the above yellow pigment had better clearness and higher tinting strength, and further had a lower viscosity and better stability with time than a coating composition prepared from a pigment obtained by not adding the compound of Synthesis Example 3.

TEST METHODS AND TEST RESULTS

The following components in the following amounts were charged into a 200 cc glass bottle.

| | |
|---|---|
| Pigment | 9 parts |
| Phthalkyd varnish | 66 parts |
| Mineral spirit | 25 parts |
| Glass beads having a diameter of 3 mm | 100 parts |
| Total | 200 parts |

The charged plastic bottle was shaken in a paint conditioner for 1 hour to give a deep-color enamel. The deep-color enamel (1 part) and 10 parts of a blue enamel were kneaded to form a light-color enamel. The deep-color enamel was applied onto a coating plate with a 6 mil applicator to evaluate hue and clearness. The light-color enamel was applied on a coating plate with a 4 mil applicator to evaluate tinting strength. Table 3 shows the results of measurement of tinting strength and viscosity.

TABLE 3

| | Tinting strength | BM viscometer (unit: cps) | | | | | | | |
|---|---|---|---|---|---|---|---|---|---|
| | | Initial viscosity | | | | Viscosity after 7 days at 50° C. | | | |
| | | 6 rpm | 12 | 30 | 60 | 6 rpm | 12 | 30 | 60 |
| Example 3 | +12% | 1,100 | 1,100 | 950 | 900 | 1,320 | 1,250 | 1,200 | 1,150 |
| C-Example 3 | standard | 4,600 | 4,520 | 4,470 | 4,400 | 6,700 | 6,600 | 6,200 | 5,800 |

Viscosity: measured by using a BM viscometer at 25° C.

EXAMPLE 4, COMPARATIVE EXAMPLES 4—1~4—4

The procedure of Example 2 for a coupling reaction was repeated except that 22.9 parts of acetoacetanilide was used in place of the coupler component of acetoaceto-o-toluidide and that a solution of 5.5 parts of the compound obtained in Synthesis Example 4 in 90 parts of a 10% acetic acid solution was used in place of the compound obtained in Example 2. The resultant slurry was adjusted to pH of 10~11 by adding an aqueous solution of sodium hydroxide, heated up to 90° C., filtered, washed with water, dried and pulverized to give 45 parts of a yellow pigment.

COMPARATIVE EXAMPLE 4—1

Example 4 was repeated except that 10% acetic acid solution of the compound obtained in Synthesis Example 4 was not added, to give 36 parts of a yellow pigment.

COMPARATIVE EXAMPLE 4—2

The procedure of Example 2 for a coupling reaction was repeated except that only 22.9 parts of acetoacetanilide was used as a coupler component, to obtain a pigment slurry. A solution of 4.5 parts of stearyl-propylenediamine in a dilute acetic acid was added to the pigment slurry, and the mixture was adjusted to pH of 10~11, heated up to 90° C., washed with water, dried and pulverized to give 45 parts of a yellow pigment.

COMPARATIVE EXAMPLE 4—3

The procedure of Example 2 was repeated except that only 22.9 parts of acetoacetanilide was used as a coupler component, to synthesize a yellow pigment. Further, the procedure of Example 2 was repeated except that only 68.4 parts of the compound obtained in Synthesis Example 4, was used as a coupler component to obtain a pigment derivative. Then, 17 parts of the yellow pigment and 3 parts of the pigment derivative were mixed to form a pigment.

COMPARATIVE EXAMPLE 4—4

N-(3-Beef tallow aminopropyl)-1,3-diaminopropane (beef tallow triamine, 16 parts) and 3.9 parts of diketene were stirred in xylene under reflux for 2 hours to give 17.5 parts of the following coupler component.

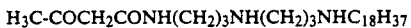

H₃C-COCH₂CONH(CH₂)₃NH(CH₂)₃NHC₁₈H₃₇

The procedure of Example 4 was repeated except that 5.5 parts of the above coupler component was used in place of the compound obtained in Synthesis Example 4, to give 45 parts of a yellow pigment.

A gravure ink prepared from the pigment obtained in Example 4 had a higher clearness, higher tinting strength, higher gloss and lower viscosity than any of inks prepared from a pigment synthesized without incorporating the component of Synthesis Example 4 (Comparative Example 4—1) and inks prepared from the pigment obtained in Comparative Examples 4—2, 4—3 and 4—4. In particular, the above gravure ink had excellent stability with time. Table 4 shows the results.

TEST METHODS AND TEST RESULTS

The following components in the following amounts were charged into a 200 cc glass bottle.

| Pigment | 10 parts |
| Lime rosin | 80 parts |
| Toluene | 10 parts |
| Glass beads having a diameter of 3 mm | 100 parts |
| Total | 200 parts |

The procedure of Example 2 was repeated. Concerning a change of color with time, an ink immediately after the preparation thereof and an ink subjected to passing of time (50° C., 4 days) were applied, and hue of each of dried coatings was observed by the eyes.

TABLE 4

| | Tinting strength | Gloss | BM viscometer (unit: cps) | | | | | | | | Change of color with time |
| | | | Initial viscosity | | | | Viscosity with time | | | | |
| | | | 6 rpm | 12 | 30 | 60 | 6 rpm | 12 | 30 | 60 | |
| Example 4 | +9% | 82% | 185 | 165 | 160 | 155 | 700 | 550 | 510 | 500 | almost no change |
| Comparatve Examples | | | | | | | | | | | |
| 4-1 | −13% | 44% | 22,100 | 18,000 | 15,500 | 15,000 | 11,700 | 9,730 | 9,700 | 8,700 | almost no change |
| 4-2 | standard | 80% | 215 | 200 | 195 | 195 | 5,200 | 4,700 | 4,500 | 4,500 | considerable change |
| 4-3 | −10% | 55% | 1,500 | 1,400 | 1,350 | 1,350 | 2,100 | 1,880 | 1,700 | 1,680 | almost no change |
| 4-4 | +5% | 72% | 1,500 | 1,590 | 1,610 | 1,620 | 4,300 | 4,950 | 5,350 | 5,950 | almost no change |

EXAMPLE 5

The procedure of Example 2 for a coupling reaction was repeated except that 22.9 parts of acetoacetanilide was used in place of acetoaceto-o-toluidide and that 5.5 parts of the compound obtained in Synthesis Example 5 was used in place of the compound obtained in Synthesis Example 2. Then, sodium hydroxide was added to adjust the resultant reaction product to pH of 9.0. Separately, 1.5 parts of sodium hydroxide, 100 parts of water and 8.1 parts of natural rosin were mixed and heated to form a solution in advance, and this solution was added to the above reaction product. The resultant mixture was stirred for 10 minutes, then filtered, washed with water, dried, and pulverized to give 47 parts of yellow pigment.

An offset ink prepared from the pigment of Example 5 and a rosin-modified phenolic resin had high transparency, clearness and tinting strength and better fluidity than an ink prepared from a pigment containing no compound of Synthesis Example 5.

EXAMPLE 6, COMPARATIVE EXAMPLE 6

2-Aminonaphthalene-1-fulfonic acid (22.4 parts), 300 parts of water and 5 parts of sodium hydroxide were mutually mixed to form a solution. 30 parts of barium chloride dihydrate was added the solution to form a barium salt, and then 25 parts of 35% hydrochloric acid was added. A solution of 1 part of the compound obtained in Synthesis Example 6 in a 10% acetic acid aqueous solution was added, 200 parts of water was added, and the resultant mixture was cooled to 0° C. A solution of 7 parts of sodium nitrite in 25 parts of water was added, and the mixture was stirred at 0°~3° C. for 30 minutes to form a diazo component.

On the other hand, 13.4 parts of β-naphthol, 5 parts of sodium hydroxide and 500 parts of water were mutually dissolved at 40° C. to form a coupler component.

The coupler component was added to the above diazo component, and the mixture was stirred for 1 hour to complete a coupling reaction and lake formation reaction. The reaction product was heated to 90° C., then filtered, washed with water, dried and pulverized to give 40 parts of a red pigment.

A printing gravure ink prepared from the above pigment had high clearness, high tinting strength, low viscosity and excellent stability with time as compared with an ink prepared from a pigment containing no pigment of Synthesis Example 6 (Comparative Example 6).

TEST METHODS AND TEST RESULTS

The tests were carried out in the same way as in Example 4. Table 5 shows the results of measurement of tinting strength and viscosity.

TABLE 5

|  | Tinting strength | BM viscometer (unit: cps) | | | | | | | |
|---|---|---|---|---|---|---|---|---|---|
|  |  | Initial viscosity | | | | Viscosity after 7 days at 50° C. | | | |
|  |  | 6 rpm | 12 | 30 | 60 | 6 rpm | 12 | 30 | 60 |
| Example 6 | +10% | 75 | 75 | 75 | 70 | 95 | 90 | 90 | 85 |
| C-Example 6 | standard | 760 | 750 | 750 | 750 | 1,200 | 1,150 | 1,130 | 1,130 |

Viscosity: measured by using a BM viscometer at 25° C.

What is claimed is:

1. An azo pigment composition formed from a coupling reaction between an aromatic amine as a diazo component and a coupler component comprising at least one member selected from the group consisting of β-naphthol, β-oxynaphthoic acid, Naphthol AS and acetoacetanilides, the diazo or coupler component containing a compound of the formula (I)

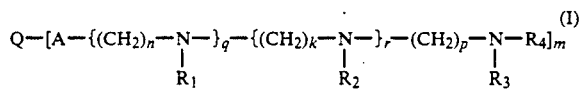

wherein:

Q represents a diazo component selected from aminobenzene and aminonaphthalene or a coupler component selected from β-naphthol, β-oxynaphthoic acid, Naphthol AS and acetoacetanilides, A represents a divalent bonding substituent selected from the group consisting of —CONR'—, —SO$_2$NR'—, —CH$_2$NH— and —CH$_2$NHCOCH$_2$NH— in which R' represents hydrogen, alkyl having 1 to 20 carbon atoms or aryl, $R_1$ to $R_4$ independently represent hydrogen, alkyl having 1 to 20 carbon atoms or alkenyl having 2 to 20 carbon atoms, n, k and p independently represent an integer of 2 or 3, m represents an integer of 1 or 2, and q and r independently represent an integer of 0 to 7 provided that q+r represents an integer of 0 to 7, and provided that when Q represents a diazo component, the amount of the compound of the formula (I) is 0.1 to 30% by weight based on the diazo component, and when Q represents a coupler component, the amount of the compound of the formula (I) is 0.1 to 30% by weight based on the coupler component.

2. A composition according to claim 1 wherein $R_1$ and $R_2$ are hydrogen, and $R_3$ and $R_4$ independently are lower alkyl having 1 to 4 carbon atoms or at least one of $R_3$ and $R_4$ is a long chain alkyl having 10 to 20 carbon atoms.

3. A composition according to claim 1 wherein the diazo or coupler component contains 1 to 10% by weight, based on the diazo or coupler component, of a compound of formula (I).

4. A composition according to claim 1, which is a mixture of a diazo pigment composition in which Q is a diazo component with a diazo pigment composition in which Q is a coupler component.

* * * * *